United States Patent
Atarius et al.

(10) Patent No.: US 6,920,324 B2
(45) Date of Patent: Jul. 19, 2005

(54) METHODS, RECEIVERS, TRANSMITTERS, AND SYSTEMS FOR PERFORMING A SOFT HAND-OVER OF A MOBILE TERMINAL BETWEEN BASE STATIONS THAT COMMUNICATE USING DIFFERENT COMMUNICATION CHANNELS

(75) Inventors: Roozbeh Atarius, Cary, NC (US); Murali Narasimha, Raleigh, NC (US); Wail Refai, Apex, NC (US); Stuart B. Sanders, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 595 days.

(21) Appl. No.: 09/829,689

(22) Filed: Apr. 10, 2001

(65) Prior Publication Data

US 2002/0147014 A1 Oct. 10, 2002

(51) Int. Cl.[7] ................................................ H04Q 7/20
(52) U.S. Cl. ........................ 455/436; 455/443; 370/331
(58) Field of Search ................................ 455/436–438, 455/434–435.2, 442; 370/321, 332

(56) References Cited

U.S. PATENT DOCUMENTS

| 5,649,308 | A | * | 7/1997 | Andrews | 370/334 |
| 5,758,266 | A | * | 5/1998 | Kornfeld et al. | 455/86 |
| 6,075,989 | A | * | 6/2000 | Moore et al. | 455/436 |
| 6,600,931 | B2 | * | 7/2003 | Sutton et al. | 455/552.1 |
| 6,606,485 | B1 | * | 8/2003 | Chen et al. | 455/140 |
| 6,711,149 | B1 | * | 3/2004 | Yano et al. | 370/342 |

OTHER PUBLICATIONS

European Patent Office Search Report, dated Jul. 5, 2001.

* cited by examiner

Primary Examiner—William Trost
Assistant Examiner—Brandon J. Miller
(74) Attorney, Agent, or Firm—Myers Bigel Sibley & Sajovec

(57) ABSTRACT

Methods, receivers, transmitters, and systems are provided for performing a soft hand-over of a mobile terminal between base station transceivers that communicate using different communication channels. A mobile terminal may be configured to receive and demodulate signals on a plurality of different communication channels concurrently and to modulate and transmit signals on a plurality of different communication channels concurrently. This allows, for example, multiple communication connections to be concurrently established between the mobile terminal and a plurality of different base station transceivers that use the different communication channels to communicate. The mobile terminal and cooperating base station transceivers may perform a soft hand-over by allowing the mobile terminal to establish communication connections with one or more new base station transceivers to decide which base station transceiver should be given control before terminating any pre-existing communication connection with a current base station transceiver.

8 Claims, 8 Drawing Sheets

"METHODS, RECEIVERS, TRANSMITTERS, AND SYSTEMS FOR PERFORMING A SOFT HAND-OVER OF A MOBILE TERMINAL BETWEEN BASE STATIONS THAT COMMUNICATE USING DIFFERENT COMMUNICATION CHANNELS"

BACKGROUND OF THE INVENTION

The present invention relates generally to the field of radiotelephone communication, and, more particularly, to performing a hand-over of a mobile terminal from one base station transceiver to another base station transceiver.

In radiotelephone communication systems that use code division multiple access (CDMA) technology, base station transceivers in the same geographical region typically share the same frequency or communication channel and use different pseudo-noise codes to avoid interfering with each other. Thus, as a mobile terminal travels throughout a geographic region, one or more "soft" hand-overs of the mobile terminal may occur from one base station transceiver to another. That is, the mobile terminal establishes a connection to a new base station transceiver candidate before terminating an existing connection with a current base station transceiver. In wideband CDMA systems, a mobile terminal may establish connections with up to three base station transceivers and select the one that provides the best service.

Unfortunately, if neighboring base station transceivers use two arbitrary frequencies or communication channels, then a mobile station may perform a "hard" hand-over between these neighboring base station transceivers. That is, the mobile terminal terminates its connection with a current base station transceiver before establishing a connection with a new base station transceiver candidate. This is sometimes called the "break before make" scenario. CDMA communication systems support channels around both the 800 MHz and 1900 MHz frequency bands. Thus, one base station transceiver may support channels in the 800 MHz band while a neighboring base station transceiver may support channels in the 1900 MHz band. A mobile terminal would, therefore, perform a hard hand-over between base station transceivers that support channels on these two different frequency bands. Note also, however, that even if neighboring base station transceivers use the same frequency band for communication, they may nevertheless use different frequencies or channels within the band, which again results in hard hand-overs of mobile terminals between the neighboring base station transceivers.

When a mobile terminal performs a hard hand-over between two base station transceivers, there is a risk that a call may be dropped as the connection with the current base station transceiver is terminated before a connection with the candidate base station transceiver is established.

SUMMARY OF THE INVENTION

Embodiments of the present invention provide methods, receivers, transmitters, and systems for performing a soft hand-over of a mobile terminal between base stations that communicate using different communication channels. A mobile terminal may be configured to receive and demodulate signals on a plurality of different communication channels concurrently and to modulate and transmit signals on a plurality of different communication channels concurrently. This allows, for example, multiple communication connections to be concurrently established between the mobile terminal and a plurality of different base station transceivers that use the different communication channels to communicate. Accordingly, the mobile terminal and cooperating base station transceivers may perform a soft hand-over by allowing the mobile terminal to establish communication connections with one or more new base station transceivers to decide which base station transceiver should be given control before terminating any pre-existing communication connection with a current base station transceiver.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE INVENTION

Figure 1:
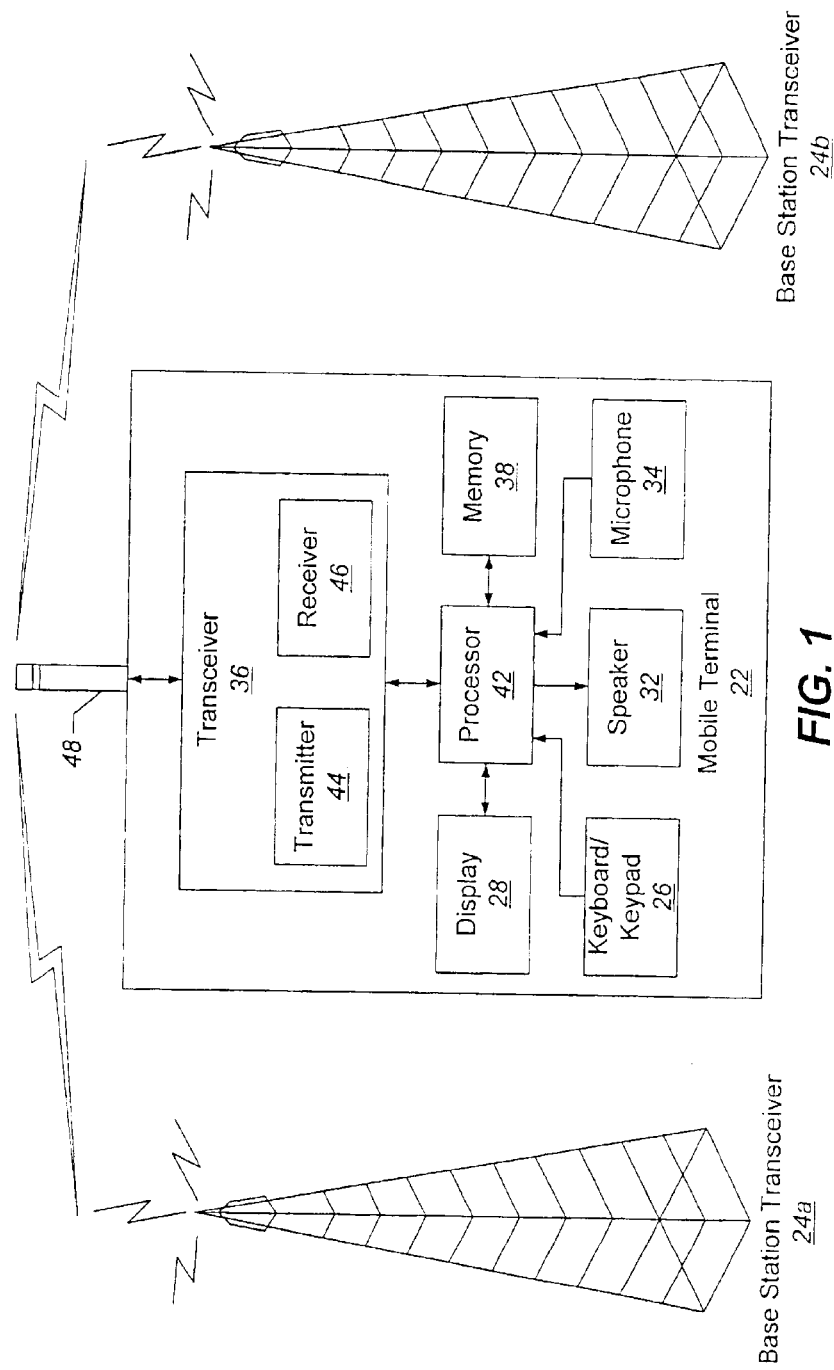
FIG. 1 is a schematic that illustrates exemplary radiotelephone communication systems in accordance with embodiments with the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. It will also be understood that when an element is referred to as being "connected" or "coupled" to another element, it can be directly connected or coupled to the other element or intervening elements may also be present. In contrast, when an element is referred to as being "directly connected" or "directly coupled" to another element, there are no intervening elements present.

For purposes of illustration, the present invention is described herein in the context of a CDMA communication system in which a mobile station establishes a plurality of concurrent communication connections with a plurality of base station transceivers using a plurality of different communication channels. It will be understood that the concepts and principles of the present invention are applicable generally to a communication device that establishes concurrent communication connections with other communication devices using a plurality of different communication channels. As used herein, the phrase "communication" band means a plurality of contiguous frequencies or communication channels in the frequency spectrum. Furthermore, the present invention may be embodied as methods, receivers, transmitters, and/or systems. Accordingly, the present invention may be embodied in hardware and/or in software (including firmware, resident software, micro-code, etc.).

Referring now to FIG. 1, an exemplary radiotelephone communication system, in accordance with embodiments of the present invention, includes a mobile terminal 22 and base station transceivers 24a and 24b. The mobile terminal 22 includes a keyboard/keypad 26, a display 28, a speaker 32, a microphone 34, a transceiver 36, and a memory 38 that communicate with a processor 42. The transceiver 36 typically comprises a transmitter circuit 44 and a receiver circuit 46, which respectively transmit outgoing radio frequency signals to the base station transceivers 24a and 24b and receive incoming radio frequency signals from the base station transceivers 24a and 24b via an antenna 48. The radio frequency signals transmitted between the mobile terminal 22 and the base station transceivers 24a and 24b may comprise both traffic and control signals (e.g., paging signals/messages for incoming calls), which are used to establish and maintain communication with another party or destination.

The foregoing components of the mobile terminal 22 may be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

The base station transceivers 24a and 24b respectively contain radio transceivers for supporting one or more individual cells in a cellular network and communicate with the mobile terminal 22 and other mobile terminals in their respective cells using a radio-link protocol. Although only two base station transceivers 24a and 24b are shown, it will be understood that many base station transceivers may be connected through, for example, a mobile switching center and other devices to define a wireless communication network.

It will be understood that although the present invention may be embodied in communication apparatus, such as the mobile terminal 22 and/or the base station transceivers 24a and 24b, the present invention is not limited to such apparatus and/or systems. For example, the present invention may be embodied in such apparatus as data processing systems, modems, and application specific integrated circuits (ASICS). Indeed, the present invention may be embodied in any method, communication apparatus, and/or system that facilitates concurrent communication connections between a communication device other communication devices using a plurality of different communication channels.

Figure 2:
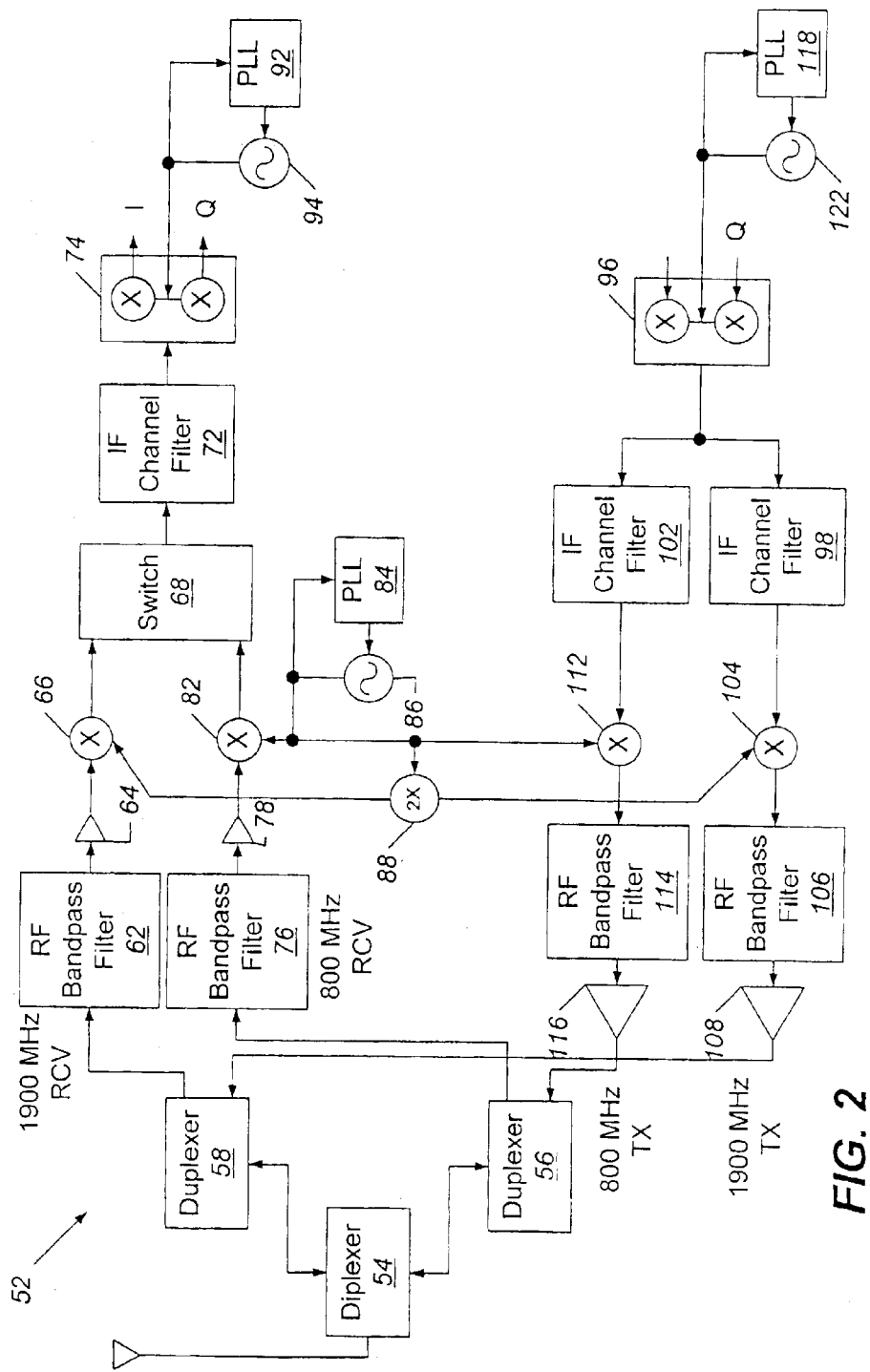
FIGS. 2 is a block diagram that illustrates a conventional receiver and transmitter.

To provide context for the description of embodiments of the present invention hereinafter, a conventional CDMA transceiver (i.e., receiver and transmitter) will be described with reference to FIG. 2. A conventional CDMA transceiver 52 comprises a diplexer circuit 54 that is connected to an 800 MHz band duplexer circuit 56 and a 1900 MHz band duplexer circuit 58. Referring now to the receiver circuitry of the CDMA transceiver 52, the 1900 MHz duplexer 58, a radio frequency (RF) bandpass filter 62, a low noise amplifier 64, a mixer circuit 66, a double pole, single throw switch 68, an intermediate frequency (IF) channel filter 72, and a mixer circuit 74 are connected in series as shown. Similarly, the 800 MHz duplexer 56, a RF bandpass filter 76, a low noise amplifier 78, a mixer circuit 82, the switch 68, the IF channel filter 72, and the mixer circuit 74 are coupled in series as shown. A phase locked loop circuit 84 in cooperation with a voltage controlled oscillator 86 provide a reference signal for the mixer circuit 82. A multiplier circuit 88 is connected to the output of the voltage controlled oscillator 86 and provides a reference signal for the mixer circuit 66. A phase locked loop circuit 92 in cooperation with a voltage controlled oscillator 94 provide a reference signal for the mixer circuit 74.

Turning next to the transmitter circuitry of the CDMA transceiver 52, a mixer circuit 96, an IF channel filter 98, a mixer circuit 104, an RF bandpass filter 106, a power amplifier 108, and the 1900 MHz duplexer circuit 58 are connected in series as shown. Similarly, the mixer circuit 96, an IF channel filter 102, a mixer circuit 112, an RF bandpass filter 114, a power amplifier 116, and the 800 MHz duplexer circuit 56 are connected in series as shown. The phase locked loop circuit 84 in cooperation with the voltage controlled oscillator 86 provide a reference signal for the mixer circuit 112. A multiplier circuit 88 is coupled to the output of the voltage controlled oscillator 86 and provides a reference signal for the mixer circuit 104. A phase locked loop circuit 118 in cooperation with a voltage controlled oscillator 122 provide a reference signal for the mixer circuit 96.

Exemplary operations of the CDMA transceiver 52 will now be described. Reception of a signal on a communication channel associated with the 1900 MHz communication band will be described first. The diplexer circuit 54 receives the incoming signal on the 1900 MHz communication band channel and routes the signal to the 1900 MHz duplexer circuit 58, which in turn routes the incoming signal to the RF bandpass filter 62. The RF bandpass filter 62 is configured to pass those frequencies that comprise the channels associated with the CDMA 1900 MHz frequency band and to block signals whose frequencies lie outside this band.

Once the RF bandpass filter 62 filters the incoming signal, it is amplified using the low noise amplifier 64 and provided as an input to the mixer circuit 66. At the mixer circuit 66, the incoming signal is multiplied by a reference signal provided by the multiplier circuit 88 to generate an output signal at an intermediate frequency that is between the 1900 MHz band RF frequency and baseband. Note that although the CDMA transceiver 52 is a dual-band transceiver (i.e., the CDMA transceiver can communicate using both 1900 MHz band and 800 MHz band communication channels), it does not communicate using communication channels from both of these bands at the same time. Therefore, the phase locked loop circuit 84 and voltage controlled oscillator circuit 86 may be tuned to generate a reference signal for stepping down a received 1900 MHz band signal to an intermediate frequency through the multiplier circuit 88 or to generate a reference signal for stepping down a received 800 MHz band signal to an intermediate frequency, which will be described hereafter.

After the mixer circuit 66 has stepped down the incoming signal from the 1900 MHz band to an intermediate frequency, the switch 68 routes the stepped down signal to the IF channel filter 72. As discussed in the foregoing, because the CDMA transceiver 52 does not communicate using channels from the 1900 MHz and 800 MHz communication bands at the same time, the switch 68 may be configured to route either the output of the mixer circuit 66 or the mixer circuit 82 to the IF channel filter 72. The IF channel filter 72 is configured to pass a frequency whose bandwidth corresponds to the bandwidth of a single communication channel on the 800 MHz and 1900 MHz communication bands, but which is centered at the intermediate frequency.

Once the stepped down incoming signal has been filtered by the IF channel filter 72, it is provided as an input to the mixer circuit 74. At the mixer circuit 74, the stepped down incoming signal is multiplied by a reference signal provided by the voltage controlled oscillator 94 to generate an output signal at baseband. That is, the mixer circuit 74 steps down the incoming signal from the intermediate frequency to baseband where the signal is typically processed as two separate components: an in-phase component I and a quadrature phase component Q. Receivers that step down an incoming signal from the RF communication band (e.g., the 1900 MHz communication band) to an intermediate frequency and ultimately to baseband are generally known as heterodyne receivers.

Figure 3:
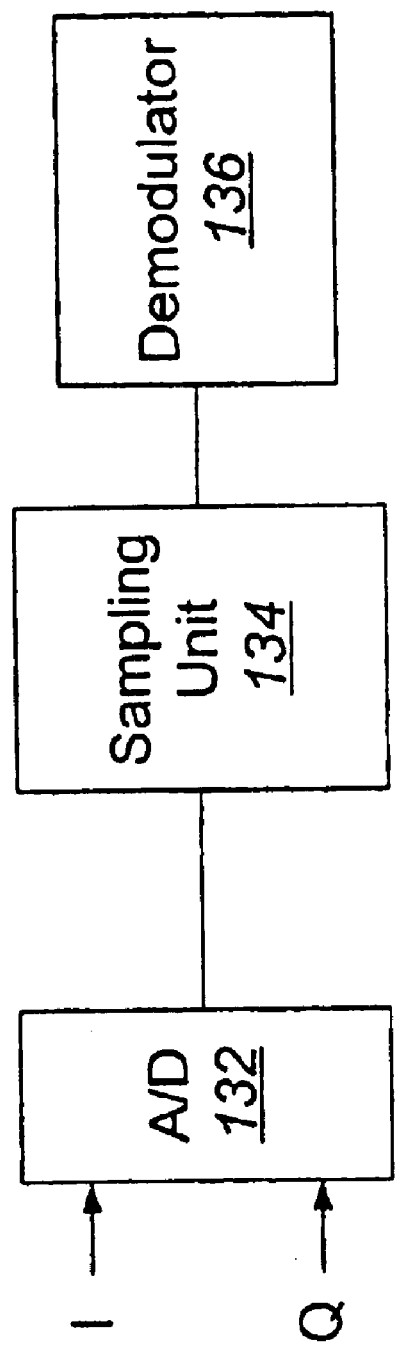
FIG. 3 is a block diagram that illustrates a conventional demodulation system.

Referring now to FIG. 3, a conventional demodulation system is illustrated. The conventional demodulation system comprises an analog to digital (A/D) converter circuit 132, a sampling unit 134, and a demodulator circuit 136 connected in series as shown. The (A/D) converter 132 converts the analog in-phase I and quadrature phase Q components of the signal output from the mixer circuit 74 to digital values, which are sampled by the sampling unit 134 at an appropriate rate. The demodulator 136 then processes these samples to extract the information that is encoded therein.

Returning to FIG. 2, reception of a signal on a communication channel associated with the 800 MHz communication band will be described next. The diplexer circuit 54 receives the incoming signal on the 800 MHz communication band channel and routes the signal to the 800 MHz duplexer circuit 56, which in turn routes the incoming signal to the RF bandpass filter 76. The RF bandpass filter 76 is configured to pass those frequencies that comprise the channels associated with the CDMA 800 MHz frequency band and to block signals whose frequencies lie outside this band.

Once the RF bandpass filter 76 filters the incoming signal, it is amplified using the low noise amplifier 78 and provided as an input to the mixer circuit 82. At the mixer circuit 82, the incoming signal is multiplied by a reference signal provided by voltage controlled oscillator 86 to generate an output signal at an intermediate frequency that is between the 800 MHz band RF frequency and baseband.

After the mixer circuit 82 has stepped down the incoming signal from the 800 MHz band to an intermediate frequency, the switch 68 routes the stepped down signal to the IF channel filter 72. The IF channel filter 72 is configured to pass a frequency whose bandwidth corresponds to the bandwidth of a single communication channel on the 800 MHz and 1900 MHz communication bands, but which is centered at the intermediate frequency.

Once the stepped down incoming signal has been filtered by the IF channel filter 72, it is provided as an input to the mixer circuit 74. At the mixer circuit 74, the stepped down incoming signal is multiplied by a reference signal provided by the voltage controlled oscillator 94 to generate an output signal at baseband. The baseband output signal is typically represented as both an in-phase component I and quadrature phase component Q, which are provided to the demodulation system of FIG. 3 as discussed above.

Transmission of a signal on a communication channel associated with the 1900 MHz communication band will be described next. A baseband information signal comprising an in-phase component I and a quadrature phase component Q is provided to the mixer circuit 96 where it is multiplied by the reference signal output from the voltage controlled oscillator 122 to step up the information signal from the baseband to an intermediate frequency between the 1900 MHz band RF frequency and baseband. The stepped up information signal output from the mixer circuit 96 is provided as an input to the IF channel filter 98. The IF channel filter 98 is configured to pass a frequency whose bandwidth corresponds to the bandwidth of a single communication channel on the 1900 MHz communication, but which is centered at the intermediate frequency.

Once the stepped up signal has been filtered by the IF channel filter 98, the stepped up signal is provided as an input to the mixer circuit 104. At the mixer circuit 104, the stepped up signal is multiplied by a reference signal provided by the multiplier circuit 88 to generate an output signal at an RF frequency that corresponds to a communication channel in the 1900 MHz communication band. The RF signal output from the mixer circuit 104 is filtered by the RF bandpass filter 106, which is configured to pass those frequencies that comprise the channels associated with the CDMA 1900 MHz frequency band and to block signals whose frequencies lie outside this band.

Once the RF information signal has been filtered by the RF bandpass filter 106, it is provided as an input to the power amplifier 108 for amplification. The amplified RF information signal is transmitted through the 1900 MHz duplexer circuit 58 and the diplexer circuit 54.

Transmission of a signal on a communication channel associated with the 800 MHz communication band will be described next. A baseband information signal comprising an in-phase component I and a quadrature phase component Q is provided to the mixer circuit 96 where it is multiplied by the reference signal output from the voltage controlled oscillator 122 to step up the information signal from the baseband to an intermediate frequency between the 800 MHz band RF frequency and baseband. The stepped up information signal output from the mixer circuit 96 is provided as an input to the IF channel filter 102. The IF channel filter 102 is configured to pass a frequency whose bandwidth corresponds to the bandwidth of a single communication channel on the 800 MHz communication band, but which is centered at the intermediate frequency.

Once the stepped up signal has been filtered by the IF channel filter 102, the stepped up signal is provided as an input to the mixer circuit 112. At the mixer circuit 112 the stepped up signal is multiplied by a reference signal provided by the voltage controlled oscillator 86 to generate an output signal at an RF frequency that corresponds to a communication channel in the 800 MHz communication band. The RF signal output from the mixer circuit 112 is filtered by the RF bandpass filter 114, which is configured to pass those frequencies that comprise the channels associated with the CDMA 800 MHz frequency band and to block signals whose frequencies lie outside this band.

Once the RF information signal has been filtered by the RF bandpass filter 114, it is provided as an input to the power amplifier 116 for amplification. The amplified RF information signal is then transmitted through the 800 MHz duplexer circuit 56 and the diplexer circuit 54.

Thus, as discussed above, although the CDMA transceiver 52 is a dual-band transceiver that can communicate using both the 1900 MHz band and 800 MHz band communication channels, it does not communicate using communication channels from both of these bands concurrently. Moreover, because the phase locked loop circuit 84 is tuned to step down a single RF communication channel and the IF channel filters 72, 98, and 102 are designed to pass frequencies corresponding to a single communication channel, the transceiver 52 does not communicate using two or more communication channels from the same communication band (i.e., two or more communication channels from the 800 MHz communication band or two or more channels from the 1900 MHz communication band) concurrently. As a result, when the CDMA transceiver 52 is used in a mobile terminal, that mobile terminal would perform a hard hand-over between neighboring base stations that use different communication channels as discussed in the background section hereinabove.

Figure 4:
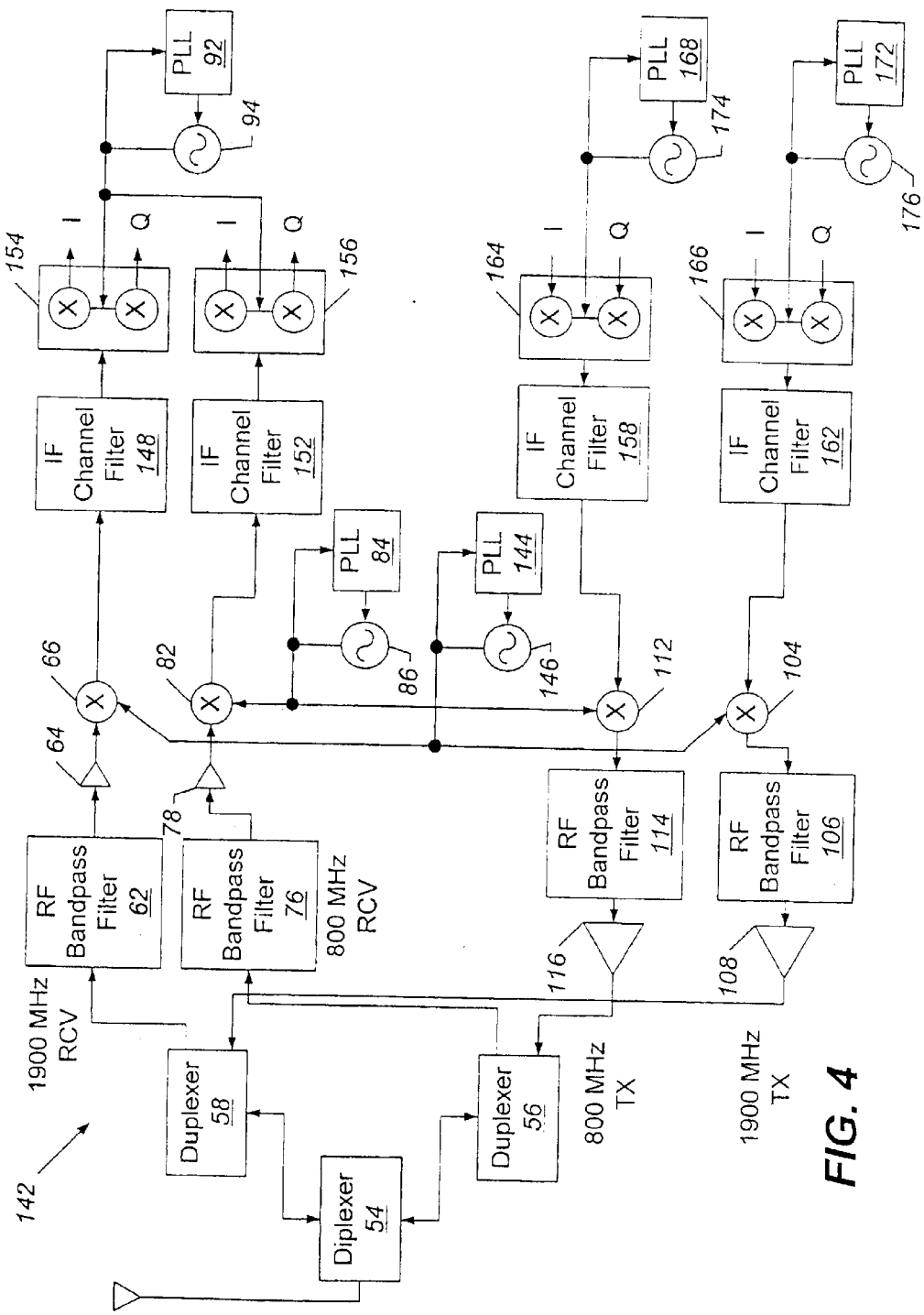
FIGS. 4–5 are block diagrams that illustrate receivers and transmitters that facilitate performing a mobile terminal soft hand-over in a radiotelephone communication system in accordance with various embodiments of the present invention.

FIG. 4 is a block diagram that illustrates transceiver circuits in accordance with embodiments of the present invention. A transceiver circuit 142 includes a phase locked loop circuit 144 that cooperates with a voltage controlled oscillator 146 to generate a reference signal for use by the mixer circuit 66 in stepping down an incoming signal from a 1900 MHz band RF frequency to the intermediate frequency and for use by the mixer circuit 104 in stepping up an information signal from the intermediate frequency to a 1900 MHz band RF frequency. In addition, with regard to the receiver circuitry, the switch 68, IF channel filter 72, and mixer circuit 74 of FIG. 2 are replaced by parallel IF channel filters 148 and 152 and mixer circuits 154 and 156, which are configured as shown. Similarly, with regard to the transmitter circuitry, the IF channel filters 98, 102 and mixer circuit 96 of FIG. 2 are replaced by parallel IF channel filters 158 and 162 and mixer circuits 164 and 166. The phase locked loop circuit 118 and voltage controlled oscillator circuit 122 for the transmitter circuitry are also replaced by phase locked loop circuits 168 and 172, which are dedicated to the mixer circuits 164 and 166, respectively, and associated voltage controlled oscillator circuits 174 and 176.

Exemplary operations of the transceiver circuit 142 will be described hereafter. By incorporating a separate, independent phase locked loop circuit 144 and voltage controlled oscillator 146 to generate a reference signal for the mixer circuits 66 and 104, the transceiver circuit may, for example, receive a first signal from a first base station transceiver on a 1900 MHz band communication channel and receive a second signal from a second base station transceiver on a 800 MHz band channel and these two signals may be concurrently stepped down to intermediate frequencies via the mixer circuits 66 and 82, respectively. The intermediate frequencies may be the same frequency or, alternatively, different intermediate frequencies may be used. To allow for concurrent processing of these two intermediate frequency signals stepped down from the 1900 MHz and 800 MHz communication bands, respectively, dual IF channel filters 148 and 152 are used to filter the stepped down signals as discussed hereinabove with respect to IF channel filter 72 of FIG. 2. That is, IF channel filter 148 is configured to pass a frequency whose bandwidth corresponds to the bandwidth of a single communication channel on the 1900 MHz communication band, but which is centered at the intermediate frequency associated with the signal output from the mixer circuit 66. Similarly, the IF channel filter 152 is configured to pass a frequency whose bandwidth corresponds to the bandwidth of a single communication channel on the 800 MHz communication band, but which is centered at the intermediate frequency associated with the signal output from the mixer circuit 82.

The output signals from the IF channel filters 148 and 152 are provided to the mixer circuits 154 and 156, respectively. The two mixer circuits 154 and 156 respectively multiply the two intermediate frequency signals, which have been stepped down from communication channels associated with the 800 MHz and 1900 MHz communication bands, respectively, by the reference signal output from the voltage controlled oscillator 94 to concurrently step down the two signals to baseband. The baseband signals output from the mixer circuits 154 and 156, respectively, may then be provided to independent demodulation systems as illustrated in FIG. 3 for demodulation.

Exemplary operations of the transmitter circuitry will be described next. Separate baseband information signals for transmission on separate communication channels associated with the 800 MHz and 1900 MHz bands are provided to the mixer circuits 164 and 166 where they are multiplied by reference signals output from the voltage controlled oscillators 174 and 176, respectively, to step up the information signals from the baseband to intermediate frequencies. These intermediate frequencies may be the same frequency or, alternatively, different intermediate frequencies may be used. The stepped up information signals output from the mixer circuits 164 and 166 are provided to the IF channel filters 158 and 162, respectively. The IF channel filter 162 is configured to pass a frequency whose bandwidth corresponds to the bandwidth of a single communication channel on the 1900 MHz communication band, but which is centered at the intermediate frequency associated with the signal output from the mixer circuit 166. Similarly, the IF channel filter 158 is configured to pass a frequency whose bandwidth corresponds to the bandwidth of a single communication channel on the 800 MHz communication band, but which is centered at the intermediate frequency associated with the signal output from the mixer circuit 164.

Like the mixer circuits 66 and 82, the mixer circuits 104 and 112 may operate concurrently due to the incorporation of the additional phase locked loop circuit 144 and voltage controlled oscillator circuit 146. Thus, the mixer circuits 112 and 104 receive the output signals from the IF channel filters 158 and 162 and step up these signals to frequencies corresponding to channels associated with the 800 MHz communication band and 1900 MHz communication bands, respectively.

Thus, when used in a mobile terminal, the transceiver 142 may allow the mobile terminal to establish concurrent connections with a plurality of base station transceivers that use different communication channels. Specifically, the transceiver 142 allows for the concurrent reception and demodulation of signals from both the 800 MHz and 1900 MHz communication bands. Moreover, the transceiver 142 allows for the concurrent transmission of signals in both the 800 MHz and 1900 MHz communication bands.

It should be understood that although the transceiver 142 of FIG. 4 is illustrated as providing concurrent signal reception and transmission capability on different frequencies that are part of different communication bands (e.g., the 800 MHz communication band and the 1900 MHz communication band), the phase locked loop circuits 84 and 144 and the IF channel filters 148, 152, 158, and 162 may be configured to concurrently receive and transmit signals from the same communication band.

Figure 5:
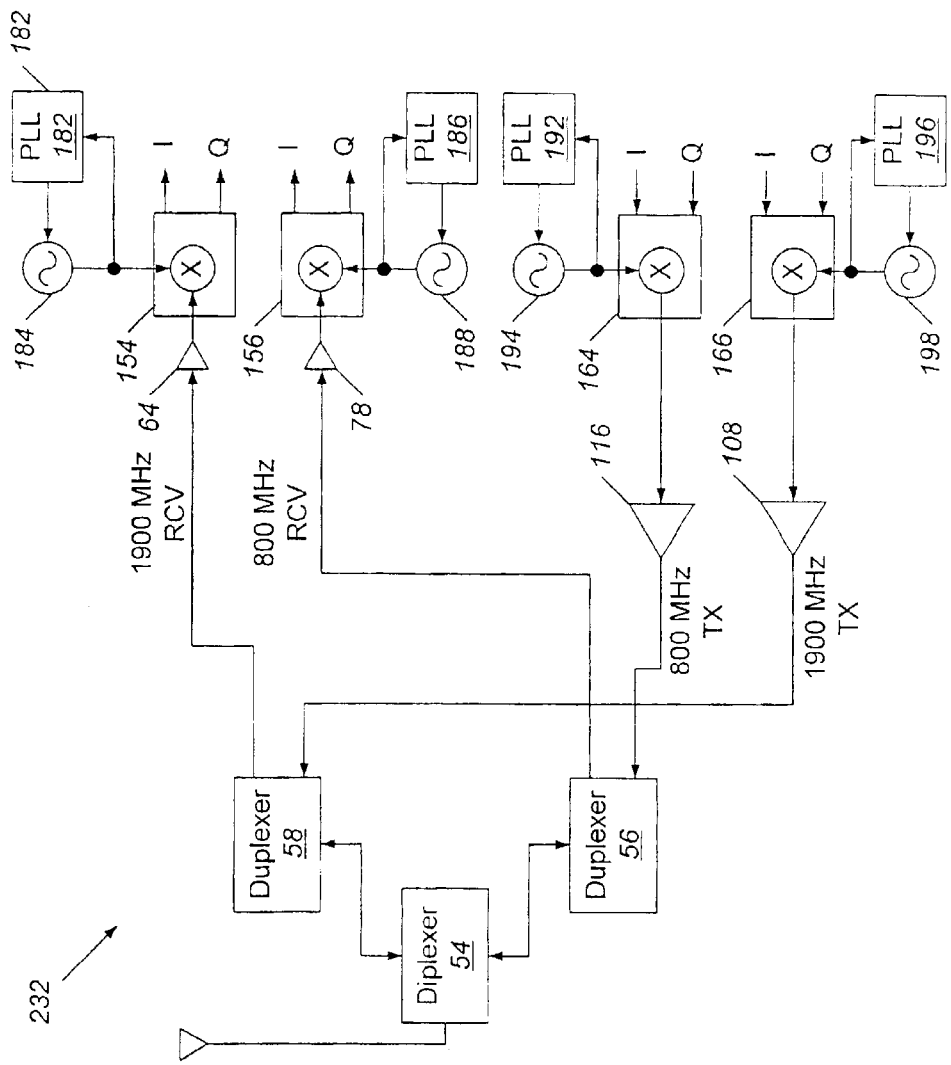

The transceiver 142 of FIG. 4 uses a heterodyne architecture in which an incoming signal is stepped down from the RF communication band (e.g., the 1900 MHz communication band) to an intermediate frequency before being stepped down to baseband. FIG. 5 is a block diagram that illustrates transceiver circuits based on a homodyne architecture in accordance with further embodiments of the present invention. A transceiver circuit 181 is similar to the transceiver circuit 142 of FIG. 4; however, the transceiver circuit 181 does not include any of the circuitry between the low noise amplifiers 64 and 68 and the mixer circuits 154 and 156 in the receiver circuitry, and does not include any of the circuitry between the power amplifiers 108 and 116 and the mixer circuits 164 and 166 in the transmitter circuitry. The transceiver circuit 181 includes a phase locked loop circuit and a voltage controlled oscillator for each of the mixer circuits 154, 156, 164, and 166. As shown in FIG. 5, phase locked loop circuit 182 and voltage controlled oscillator 184 provide a reference signal for the mixer circuit 154, phase locked loop circuit 186 and voltage controlled oscillator 188 provide a reference signal for the mixer circuit 156, phase locked loop circuit 192 and voltage controlled oscillator 194 provide a reference signal for the mixer circuit 164, and phase locked loop circuit 196 and voltage controlled oscillator 198 provide a reference signal for the mixer circuit 166, Thus, in contrast with the transceiver circuit 142 of FIG. 4, the transceiver circuit 181 may step received signals down from the 1900 MHz and 800 MHz communication bands directly to baseband through the mixer circuits 154 and 156, respectively. Similarly, the transceiver circuit 181 may step baseband information signals up to channels associated with the 1900 MHz and 800 MHz bands directly through the mixer circuits 166 and 164.

Because voltage controlled oscillators can be expensive components, it may be desirable to use an expensive, high quality voltage controlled oscillator to generate a reference signal and then derive other reference signals from this reference signal using less expensive voltage controlled oscillators. For example, it may be desirable to make voltage controlled oscillator 188 a high quality voltage controlled oscillator and then use the output signal therefrom to derive the reference signal for the mixer circuit 154 where the voltage controlled oscillator 184 is a lower quality or less expensive voltage controlled oscillator.

Figure 6:
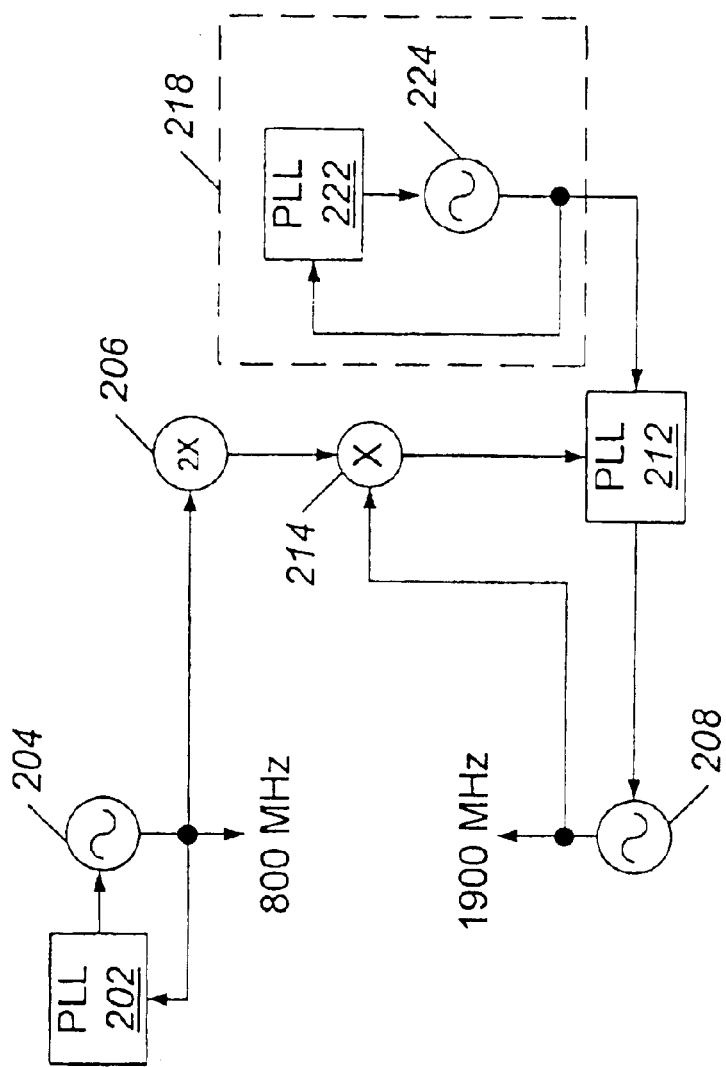
FIG. 6 is a block diagram that illustrates circuits for deriving a second reference signal from a first reference signal in accordance with embodiments of the present invention.

FIG. 6 is a block diagram that illustrates circuits for deriving a second reference signal from a first reference signal in accordance with embodiments of the present invention. A high quality voltage controlled oscillator is configured in a feedback loop with a phase locked loop circuit 202. The output of the voltage controlled oscillator 204 is provided as an input to the multiplier circuit 214. A second voltage controlled oscillator circuit is configured in a feedback loop with a phase locked loop circuit 212 through a mixer circuit 214. Finally, an offset phase locked loop circuit 218 provides a second input to the phase locked loop circuit 212. The offset phase locked loop circuit comprises a phase locked loop circuit 222 and a voltage controlled oscillator 224, which are configured as shown.

Operations of the reference signal derivation circuitry of FIG. 6 may be illustrated by way of example. The output signal of the voltage controlled oscillator 204 may be tuned to be approximately 824 MHz–849 MHz. The multiplier circuit 214 generates an output signal that is approximately double the frequency of the output signal of the voltage controlled oscillator 204. The offset phase locked loop circuit 218 generates an output signal from the voltage controlled oscillator 224 that is approximately equal to the frequency difference between the output signal of the multiplier circuit 214 and the output signal of the voltage controlled oscillator 208. Thus, if the output signal of the voltage controlled oscillator 208 is approximately 1930 MHz–1990 MHz, then the output signal of the offset phase locked loop circuit is approximately 232 MHz–342 MHz. The mixer circuit 214 generates an output signal at a frequency approximately equal to the difference of the output signal of the voltage controlled oscillator 208 and the multiplier circuit 206. Because this frequency difference is approximately the same as the frequency of the output signal from the offset phase locked loop circuit 218, the output signal from the voltage controlled oscillator 208 remains locked at a frequency that is derived from a signal output from the high quality voltage controlled oscillator 204.

Thus, the circuitry of FIG. 6 may be used to generate various reference signals in the transceiver circuits 142 and 181 of FIGS. 4 and 5 instead of using independent phase locked loop circuits to reduce the cost of voltage controlled oscillators.

Figure 7:
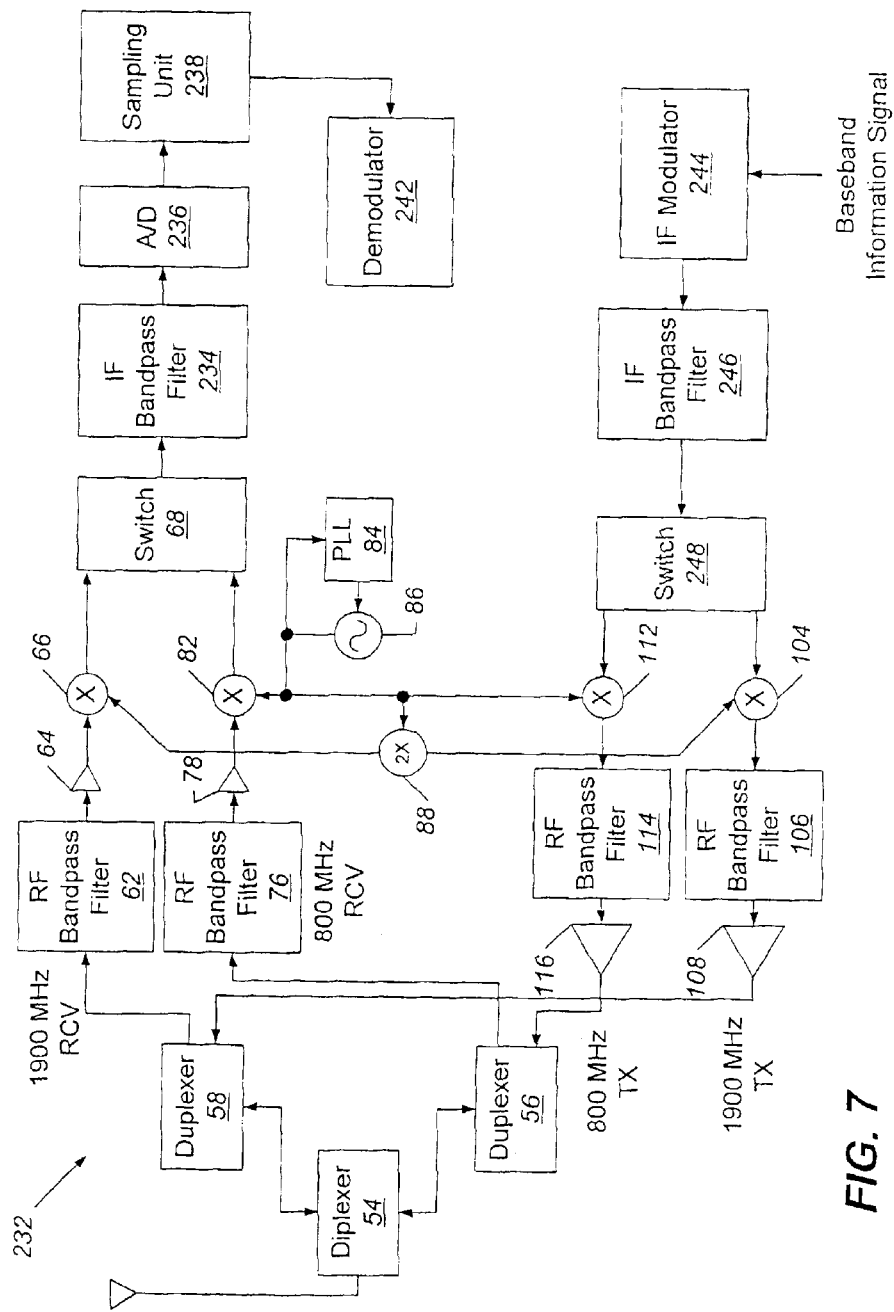
FIGS. 7–8 are block diagrams that illustrate receivers and transmitters that facilitate performing a mobile terminal soft hand-over in accordance with further embodiments of the present invention.

FIG. 7 is a block diagram that illustrates transceiver circuits in accordance with further embodiments of the present invention. A transceiver circuit 232 includes receiver circuitry that is identical to the receiver circuitry of the transceiver circuit 142 of FIG. 2 through the switch 68. Rather than including an IF channel filter 72, a mixer circuit 74, a phase locked loop circuit 92, and a voltage controlled oscillator 94 for stepping a received signal down to baseband, the transceiver circuit 232 includes an IF bandpass filter 234, an A/D converter 236, a sampling unit 238, and a demodulator 242, which are connected in series as shown. Similarly, rather than including IF channel filters 98, 102, a mixer circuit 96, a phase locked loop circuit 118, and a voltage controlled oscillator 122 for stepping a baseband information signal up to an intermediate frequency, the transceiver circuit 232 includes an IF modulator 244 and an IF bandpass filter 246, which are connected in series as shown.

Operations of the receiver circuitry of the transceiver circuit 232 will be described hereafter. The IF bandpass filter 234 is configured to pass frequencies that lie in the bandwidth defined by the entire 1900 MHz or 800 MHz communication bands, but which is centered around the intermediate frequency. Thus, when communicating using, for example, the 1900 MHz communication band, the IF bandpass filter 234 captures signals from any communication channel within that band. The A/D converter 236 converts the output from the IF bandpass filter 234 to digital values and these values are then sampled by the sampling unit 238. The demodulator 242 may then use these samples to detect one or more signals received from, for example, base station transceivers that use different communication channels within the same communication band. These detected signals may be demodulated concurrently allowing the transceiver circuit to establish concurrent communication connections with other communication apparatus (e.g., base station transceivers) using different communication channels within the same communication band.

Operations of the transmitter circuitry of the transceiver circuit 232 will now be described. A baseband information signal may be modulated by an IF modulator 244 to be placed into a frequency band that is centered around the intermediate frequency but has a bandwidth corresponding to the entire bandwidth of the 1900 MHz or 800 MHz communication bands. The output of the IF modulator 244 is filtered by the IF bandpass filter 246, which is configured to pass frequencies that lie in the bandwidth defined by the entire 1900 MHz or 800 MHz communication bands, but which is centered around the intermediate frequency. The output of the IF bandpass filter 246 is provided to a single pole, double throw switch 248, which routes the output of the IF bandpass filter 246 to either the mixer circuit 104 or the mixer circuit 112 for transmission over either the 1900 MHz or 800 MHz communication bands, respectively, as described hereinabove with respect to FIG. 2.

Thus, the transceiver circuit 232 when used in a mobile terminal, for example, may allow the mobile terminal to establish concurrent communication connections with a plurality of base station transceivers using a plurality of different communication channels from the same communication band.

Figure 8:
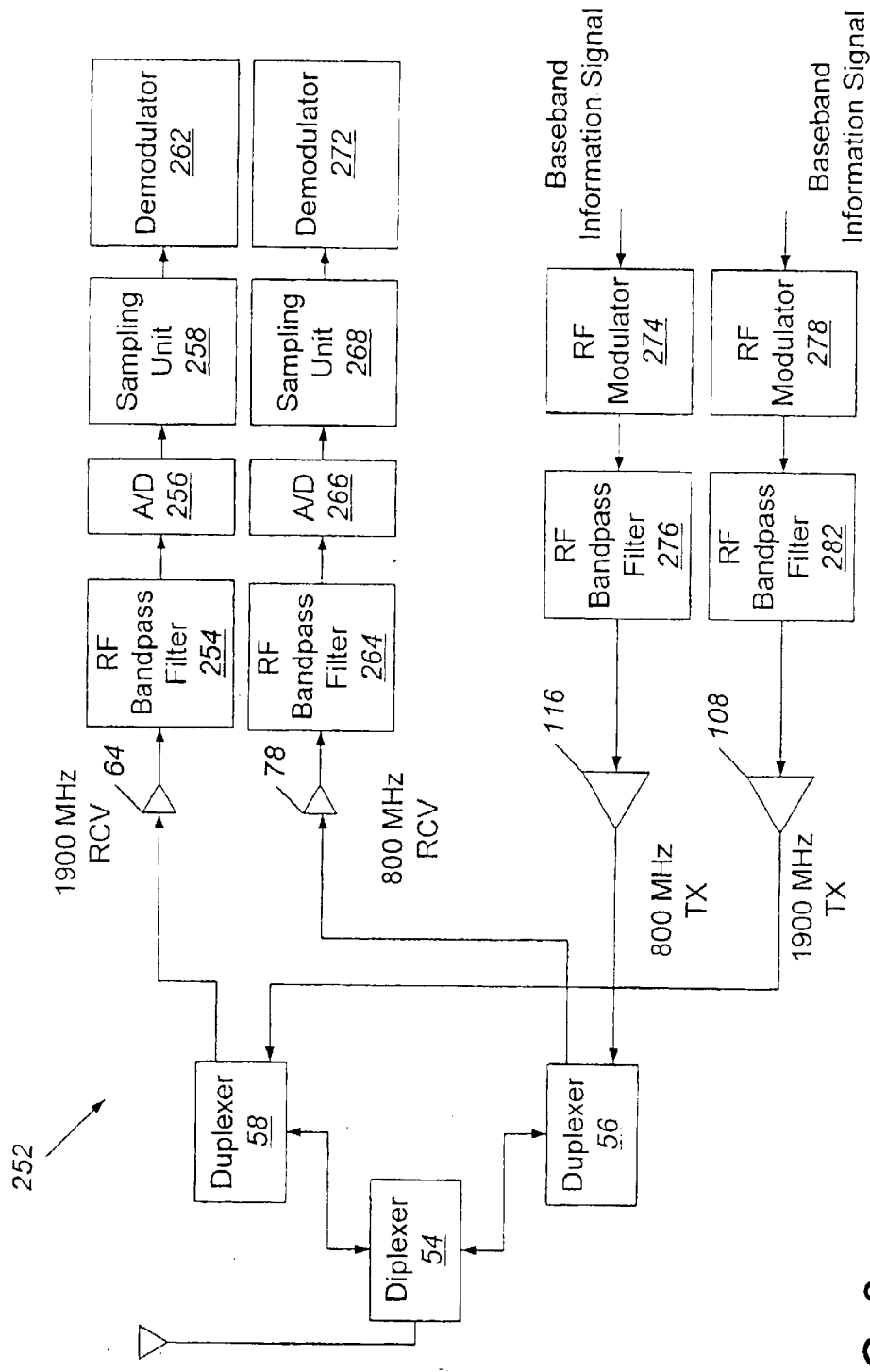

FIG. 8 is a block diagram that illustrates transceiver circuits in accordance with further embodiments of the present invention. A transceiver circuit 252 uses a homodyne architecture similar to the transceiver circuit of FIG. 5. Instead of using the mixer circuit 154, phase locked loop circuit 182, and voltage controlled oscillator 184 to step down a received signal directly from an RF frequency to baseband, the transceiver circuit 252 includes an RF bandpass filter 254, an A/D converter 256, a sampling unit 258, and a demodulator 262, which are connected in series as shown. Similarly, instead of the mixer circuit 156, phase locked loop circuit 186, and voltage controlled oscillator 188, the transceiver circuit 252 uses an RF bandpass filter 264, an A/D converter 266, a sampling unit 268, and a demodulator 272, which are connected in series as shown. With regard to the transmitter circuitry, instead of using the mixer circuit 164, phase locked loop circuit 192, and voltage controlled oscillator 194 to step up a baseband information signal to an RF frequency, the transceiver circuit 252 uses an RF modulator 274 and RF bandpass filter 276, which are connected in series as shown. Similarly, instead of the mixer circuit 166, phase locked loop circuit 196, and voltage controlled oscillator 198, the transceiver circuit uses an RF modulator 278 and an RF bandpass filter 282, which are connected in series as shown.

Operations of the receiver circuitry of the transceiver circuit 252 will be described hereafter. The RF bandpass filter 254 is configured to pass frequencies that lie in the bandwidth defined by the entire 1900 MHz communication band. Thus, the RF bandpass filter 254 captures signals from any communication channel within the 1900 MHz band. The A/D converter 256 converts the output from the RF bandpass filter 254 to digital values and these values are then sampled by the sampling unit 258. The demodulator 262 may then use these samples to detect one or more signals received from, for example, base station transceivers that use different communication channels within the 1900 MHz communication band. These detected signals may be demodulated concurrently allowing the transceiver circuit to establish concurrent communication connections with other communication apparatus (e.g., base station transceivers) using different communication channels within the same communication band.

Similarly, the RF bandpass filter 264 is configured to pass frequencies that lie in the bandwidth defined by the entire 800 MHz communication band. Thus, the RF bandpass filter 264 captures signals from any communication channel within the 800 MHz band. The A/D converter 266 converts the output from the RF bandpass filter 264 to digital values and these values are then sampled by the sampling unit 268. The demodulator 272 may then use these samples to detect one or more signals received from, for example, base station transceivers that use different communication channels within the 800 MHz communication band.

Operations of the transmitter circuitry of the transceiver circuit 252 will now be described. A baseband information signal may be modulated by an RF modulator 274 to be placed into an RF frequency band that corresponds to the 800 MHz communication band. The output of the RF modulator 274 is filtered by the RF bandpass filter 276, which is configured to pass frequencies that lie in the 800 MHz communication band. The output of the RF bandpass filter 276 is provided to the power amplifier 116 for transmission as described hereinabove with respect to FIGS. 2 and 5.

Similarly, a baseband information signal may be modulated by an RF modulator 278 to be placed into an RF frequency band that corresponds to the 1900 MHz communication band. The output of the RF modulator 278 is filtered by the RF bandpass filter 282, which is configured to pass frequencies that lie in the 1900 MHz communication band. The output of the RF bandpass filter 282 is provided to the power amplifier 108 for transmission as described hereinabove with respect to FIGS. 2 and 5.

When used in a mobile terminal, the transceiver embodiments of FIGS. 4, 5, 7, and 8 may allow the mobile terminal to establish concurrent connections with a plurality of base station transceivers that use a plurality of different communication channels. Moreover, the mobile terminal may perform a soft hand-over between base stations that use different communication channels. For example, the mobile terminal may have an association with a current base station transceiver and may then establish communication connections with one or more additional base station transceivers. The mobile terminal may then select one of these additional base station transceivers with which it has established a communication connection to be the next base station transceiver with which it will establish an association. A soft hand-over may be performed by creating a new association between the mobile terminal and the selected base station transceiver before terminating the existing association between the mobile terminal and the current base station transceiver.

In particular embodiments of the present invention, the plurality of different communication channels may comprise channels from different communication bands (i.e., bands of contiguous communication channels). For example, the plurality of different communication channels may include one or more channels from both the code division multiple access (CDMA) 800 MHz communication band and the CDMA 1900 MHz communication band. In other embodiments of the present invention, the plurality of different communication channels may comprise channels from a single communication band.

According to various embodiments of the present invention, concurrent communication connections between a mobile terminal and a plurality of base station transceivers may be established in alternative ways. For example, the mobile terminal may sample an entire band of contiguous communication channels to detect signals received from the plurality of base station transceivers. These detected signals from the plurality of base station transceivers may then be concurrently demodulated. In particular embodiments, the mobile terminal may use a bandpass filter to capture signals transmitted in the band of contiguous communication channels. These captured or received signals, which may be radio frequency signals, may be stepped down to an intermediate frequency before the signals are sampled or, alternatively, the captured or received signals may be sampled at their radio frequencies.

In other embodiments of the present invention, a mobile terminal may be configured with front end receiver and transmitter circuitry that allows for concurrent, independent processing of signals on different communication channels, which are typically associated with different base station transceivers as discussed above. The ability for concurrent processing of received and transmitted signals may allow the mobile terminal to participate in concurrent communication connections with base station transceivers using different communication channels. Specifically, a plurality of signals received on different communication channels from a plurality of base station transceivers may be concurrently demodulated at the mobile terminal and a plurality of signals may be transmitted concurrently from the mobile terminal to the plurality of base station transceivers.

In accordance with various embodiments of the present invention, the plurality of signals received from the plurality of base station transceivers, which are non-baseband signals, are stepped down directly to baseband for demodulation. Similarly, information signals may be stepped up directly from baseband to non-baseband frequencies for transmission. The non-baseband frequencies may comprise the frequencies corresponding to the communication channels used by the plurality of base station transceivers, which are typically radio frequency channels.

In other embodiments, the plurality of signals received from the plurality of base station transceivers may be stepped down to an intermediate frequency first before being stepped down to baseband. Similarly, the information signals to be transmitted may be stepped up from baseband to an intermediate frequency before being stepped up to frequencies corresponding to the communication channels used by the plurality of base station transceivers for transmission.

It should be noted that many variations and modifications can be made to the preferred embodiments described above without substantially departing from the principles of the present invention. All such variations and modifications are intended to be included herein within the scope of the present invention, as set forth in the following claims.

We claim:

1. A method of performing a mobile terminal hand-over, comprising:
    establishing concurrent communication connections between the mobile terminal and a plurality of base station transceivers using a plurality of different communication channels that are associated with a communication band of contiguous communication channels, wherein respective ones of the plurality of base station transceivers are associated with respective ones of the plurality of different communication channels, comprising:
    filtering radio frequency (RF) signals received by the mobile terminal using a bandpass filter that passes frequencies corresponding to the communication band of contiguous communication channels;
    sampling the band of RF frequencies at the mobile terminal to detect a plurality of signals received from the plurality of base station transceivers, wherein respective ones of the plurality of received signals are associated with respective ones of the plurality of base station transceivers; and
    concurrently demodulating the detected plurality of signals received from the plurality of base station transceivers.

2. A method of performing a mobile terminal hand-over, comprising:
    establishing concurrent communication connections between the mobile terminal and a plurality of base station transceivers using a plurality of different communication channels that are associated with a communication band of contiguous communication channels, wherein respective ones of the plurality of base station transceivers are associated with respective ones of the plurality of different communication channels, comprising:
    filtering signals received by the mobile terminal using a bandpass filter that passes frequencies corresponding to the communication band of contiguous communication channels;
    stepping down signals received by the mobile terminal and passed by the bandpass filter from frequencies corresponding to the communication band of contiguous communication channels to a band of intermediate frequencies;
    sampling the band of intermediate frequencies at the mobile terminal to detect a plurality of signals received from the plurality of base station transceivers, wherein respective ones of the plurality of received signals are associated with respective ones of the plurality of base station transceivers; and
    concurrently demodulating the detected plurality of signals received from the plurality of base station transceivers.

3. The method of claim 1, wherein the mobile terminal is associated with an original one of the plurality of base station transceivers, the method further comprising:
    selecting one of the plurality of base station transceivers other than the one of the plurality of base station transceivers with which the mobile terminal is associated;
    creating a new association between the mobile terminal and the selected one of the plurality of base station transceivers; then
    destroying the association between the mobile terminal and the original one of the plurality of base station transceivers.

4. A system for performing a mobile terminal hand-over, comprising:
    means for establishing concurrent communication connections between the mobile terminal and a plurality of base station transceivers using a plurality of different communication channels that are associated with a communication band of contiguous communication channels, wherein respective ones of the plurality of base station transceivers are associated with respective ones of the plurality of different communication channels, comprising:
    means for filtering radio frequency (RF) signals received by the mobile terminal using a bandpass filter that passes frequencies corresponding to the communication band of contiguous communication channels;
    means for sampling the band of RF frequencies at the mobile terminal to detect a plurality of signals received from the plurality of base station transceivers, wherein respective ones of the plurality of received signals are associated with respective ones of the plurality of base station transceivers; and means for concurrently demodulating the detected plurality of signals received from the plurality of base station transceivers.

5. A system for performing a mobile terminal hand-over, comprising:
   means for establishing concurrent communication connections between the mobile terminal and a plurality of base station transceivers using a plurality of different communication channels that are associated with a communication band of contiguous communication channels, wherein respective ones of the plurality of base station transceivers are associated with respective ones of the plurality of different communication channels, comprising:
   means for filtering signals received by the mobile terminal using a bandpass filter that passes frequencies corresponding to the communication band of contiguous communication channels;
   means for stepping down signals received by the mobile terminal and passed by the bandpass filter from frequencies corresponding to the communication band of contiguous communication channels to a band of intermediate frequencies;
   means for sampling the band of intermediate frequencies at the mobile terminal to detect a plurality of signals received from the plurality of base station transceivers, wherein respective ones of the plurality of received signals are associated with respective ones of the plurality of base station transceivers; and
   means for concurrently demodulating the detected plurality of signals received from the plurality of base station transceivers.

6. The system of claim 4, wherein the mobile terminal is associated with an original one of the plurality of base station transceivers, the system further comprising:
   means for selecting one of the plurality of base station transceivers other than the one of the plurality of base station transceivers with which the mobile terminal is associated;
   means for creating a new association between the mobile terminal and the selected one of the plurality of base station transceivers; and
   means for destroying the association between the mobile terminal and the original one of the plurality of base station transceivers responsive to the means for creating the new association between the mobile terminal and the selected one of the plurality of base station transceivers.

7. The method of claim 2, wherein the mobile terminal is associated with an original one of the plurality of base station transceivers, the method further comprising:
   selecting one of the plurality of base station transceivers other than the one of the plurality of base station transceivers with which the mobile terminal is associated;
   creating a new association between the mobile terminal and the selected one of the plurality of base station transceivers; then
   destroying the association between the mobile terminal and the original one of the plurality of base station transceivers.

8. The system of claim 5, wherein the mobile terminal is associated with an original one of the plurality of base station transceivers, the system further comprising:
   means for selecting one of the plurality of base station transceivers other than the one of the plurality of base station transceivers with which the mobile terminal is associated;
   means for creating a new association between the mobile terminal and the selected one of the plurality of base station transceivers; and
   means for destroying the association between the mobile terminal and the original one of the plurality of base station transceivers responsive to the means for creating the new association between the mobile terminal and the selected one of the plurality of base station transceivers.

* * * * *